(12) United States Patent
Poder et al.

(10) Patent No.: US 10,721,257 B2
(45) Date of Patent: *Jul. 21, 2020

(54) PROTECTING NETWORK DEVICES FROM SUSPICIOUS COMMUNICATIONS

(71) Applicant: Comcast Cable Communications, LLC, Philadelphia, PA (US)

(72) Inventors: James Poder, Carlsbad, CA (US); Mark D. Francisco, Clarksburg, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,233

(22) Filed: Feb. 6, 2019

(65) Prior Publication Data

US 2020/0014715 A1 Jan. 9, 2020

Related U.S. Application Data

(63) Continuation of application No. 15/040,670, filed on Feb. 10, 2016, now Pat. No. 10,243,979.

(60) Provisional application No. 62/114,850, filed on Feb. 11, 2015.

(51) Int. Cl.
*H04L 29/06* (2006.01)

(52) U.S. Cl.
CPC ...... *H04L 63/1425* (2013.01); *H04L 63/1408* (2013.01); *H04L 63/1416* (2013.01)

(58) Field of Classification Search
CPC ............ H04L 63/1408; H04L 63/1416; H04L 63/1425

See application file for complete search history.

(56) References Cited

U.S. PATENT DOCUMENTS

| | | | | |
|---|---|---|---|---|
| 7,290,283 | B2* | 10/2007 | Copeland, III | H04L 43/026 726/25 |
| 7,917,393 | B2* | 3/2011 | Valdes | H04L 41/0631 705/50 |
| 8,479,057 | B2* | 7/2013 | Poletto | H04L 41/0893 709/224 |
| 9,558,347 | B2* | 1/2017 | Chari | G06F 21/50 |
| 2002/0144156 | A1* | 10/2002 | Copeland, III | H04L 43/026 726/22 |
| 2003/0004688 | A1* | 1/2003 | Gupta | G06F 21/55 702/188 |
| 2003/0188189 | A1* | 10/2003 | Desai | H04L 63/104 726/23 |
| 2007/0289013 | A1* | 12/2007 | Lim | G06F 21/552 726/22 |
| 2009/0100518 | A1* | 4/2009 | Overcash | G06F 21/552 726/22 |
| 2009/0174551 | A1* | 7/2009 | Quinn | G06F 21/552 340/540 |

(Continued)

*Primary Examiner* — Joseph P Hirl
*Assistant Examiner* — Thomas A Gyorfi
(74) *Attorney, Agent, or Firm* — Banner & Witcoff, Ltd.

(57) ABSTRACT

According to some aspects, disclosed methods and systems may comprise generating a profile that is based on monitoring a communication pattern associated with a device. Subsequent communications associated with the device may be monitored. Based on the profile and the subsequent communication, a security status may be associated with the device.

20 Claims, 4 Drawing Sheets

(56) References Cited

U.S. PATENT DOCUMENTS

2010/0142382 A1* 6/2010 Jungck ............... H04L 63/0245
                                                370/242
2012/0227105 A1* 9/2012 Friedrichs ............ G06F 21/564
                                                726/22

* cited by examiner

PROTECTING NETWORK DEVICES FROM SUSPICIOUS COMMUNICATIONS

RELATED APPLICATIONS

This application is a continuation of U.S. application Ser. No. 15/040,670, filed Feb. 10, 2016 which claims priority U.S. Application Ser. No. 62/114,850, filed Feb. 11, 2015, which is hereby incorporated by reference in its entirety.

BACKGROUND

More and more devices are being added to communication networks every day. Some of these devices may act in a suspicious manner. There is an ever-present need to protect an electronic device on a network from suspiciously communicating with other devices internal and external to that network.

SUMMARY

The following summary is for illustrative purposes only, and is not intended to limit or constrain the detailed description.

Aspects of the disclosure generally relate to systems, methods, apparatuses and computer-readable media for providing enhanced security on a network. According to some aspects, the disclosure relates to providing a layer of security for a network by determining a profile of expected communication behavior for one or more devices in the network. According to some aspects, if a device begins to communicate in an abnormal manner that may be inconsistent with the profile, a local office, service provider, or device associated with the network may engage that device to secure that network. According to some aspects, the abnormal communication may be associated with malware or a virus that may be installed on a device or with other security breaches. The disclosure relates to preventing or limiting threating and/or threatened devices from communicating via the network.

The summary here is not an exhaustive listing of the novel features described herein, and is not limiting of any claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is shown by way of example, and not limited by, the accompanying figures in which like numerals indicate similar elements.

DETAILED DESCRIPTION

In the following description of various illustrative embodiments, reference is made to the accompanying drawings identified above, which form a part hereof, and in which is shown by way of illustration various embodiments in which aspects of the disclosure may be practiced. Other embodiments may be utilized and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, removable storage media, solid state memory, RAM, magnetic storage devices, and/or any combination thereof. In addition, the functionality may be embodied in whole or in part in firmware or hardware equivalents, such as integrated circuits, field programmable gate arrays (FPGAs), and the like. Various signals representing data or events as described herein may be transferred between a source and a destination in the form of electromagnetic waves traveling through signal-conducting media such as metal wires, optical fibers, and/or wireless transmission media (e.g., air and/or space).

Figure 1:
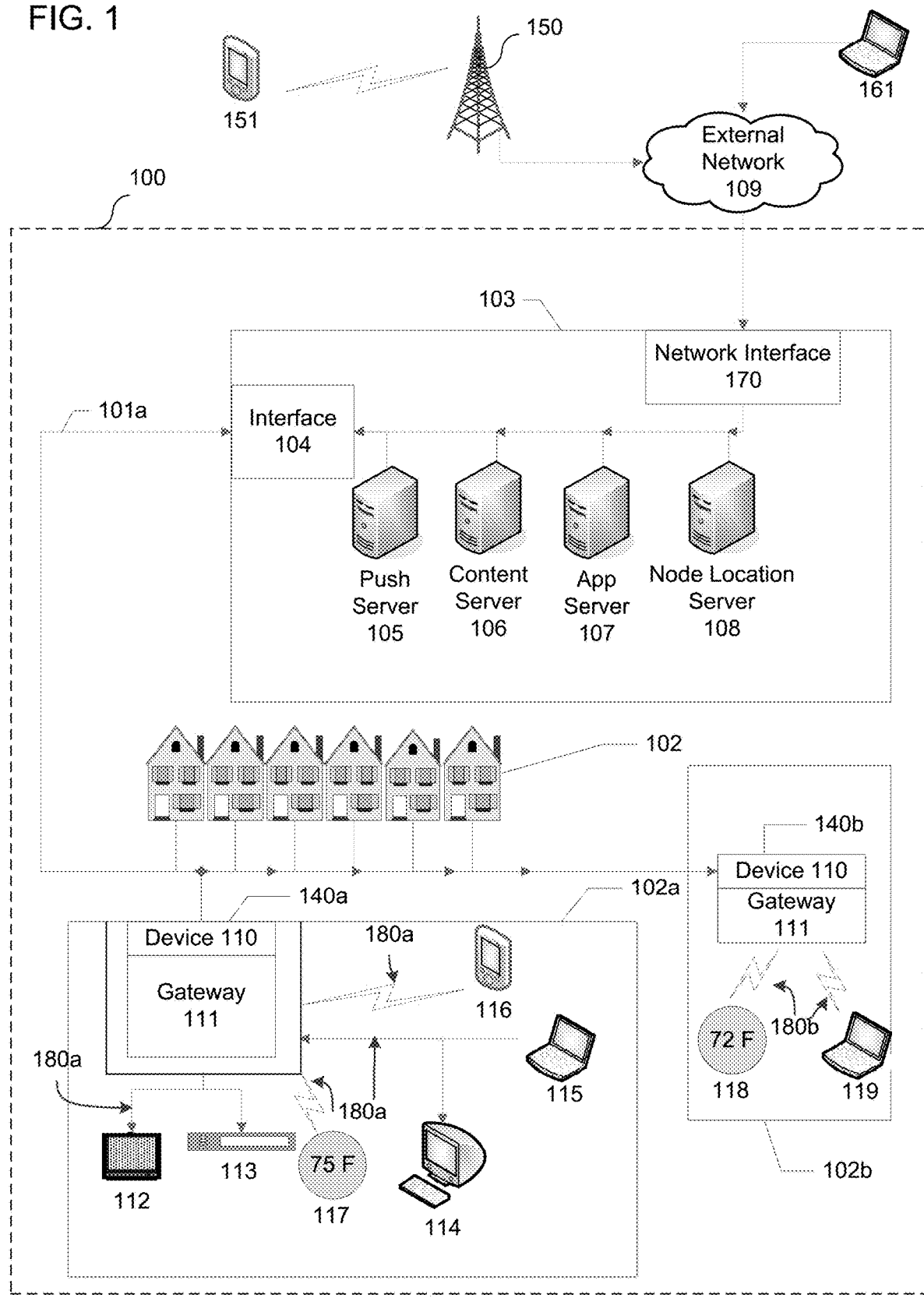
FIG. 1 shows an example communication network system on which various features described herein may be used.

FIG. 1 shows an example network 100, such as a telecommunications or a content delivery network, on which many of the various features described herein may be implemented. The network 100 may be any type of information distribution network, such as satellite, telephone, cellular, wireless, etc. One example may be an optical fiber network, a coaxial cable network, or a hybrid fiber/coax (HFC) distribution network. Such networks 100 may use a series of interconnected communication lines 101a (e.g., coaxial cables, optical fibers, wireless links, etc.) to communicate with access node devices 140a and 140b (also referred to as access devices or access devices) and other premises 102 (e.g., locations, buildings, structures, businesses, homes, consumer dwellings, etc.), which may include other access node devices, to a local office 103 (e.g., headend, central office, service provider, server, etc.). The local office 103 may transmit downstream information signals onto the lines 101a to the access node devices 140a and 140b and other premises 102. Each access node device 140a and 140b and access node devices at other premises 102 may have a receiver used to receive and process those signals. According to some aspects, the network 100 may be associated with a security monitoring system, which may be configured to monitor one or more devices associated with the network 100 and configured to monitor communication and/or data transmitted to and/or from one or more of the devices associated with the network 100.

There may be one line 101a originating from the local office 103, and it may be split a number of times to distribute the signal to various access node devices 140a and 140b and other premises 102 in the vicinity (which may be many miles) of the local office 103. The access node devices 140*a* and 140*b* may refer to hardware modules including e.g., a device 110, such as a modem, and a gateway interface 111. In some aspects, an access node device 140*a* or 140*b* may refer to a wireless (e.g., Wi-Fi, etc.) hotspot that allows various user devices (e.g., wireless laptops and netbooks, mobile phones, mobile televisions, personal digital assistants (PDA), etc.) to communicate with the network 100 and external networks 109 (e.g., a network external to the network 100) for access to various content, including content found over the Internet. The device 110 may include transmitters and receivers used to communicate on the lines 101*a* and with the local office 103. Within a given access node device 140*a* or 140*b*, the device 110 may be, for example, a coaxial cable modem (for the coaxial cable lines 101*a*), a fiber interface node device (for the fiber optic lines 101*a*), or any other desired device. The gateway interface device 111 may be a computing device (e.g., a router for wireless (e.g., Wi-Fi, etc.) connectivity, etc.) that communicates with the device 110 to allow one or more devices to communicate with the local office 103 and other devices beyond the local office 103, such as those devices in communication with to the external networks 109. The gateway interface device 111 may also include wireless network interfaces (not shown) to provide communication signals to wireless devices. The access node devices 140*a* and 140*b* may transmit more than one wireless network identifier (e.g., SSID). For example, the access node devices 140*a* or 140*b* may transmit one network identifier which is configurable by a subscriber or user and another network identifier which is only configurable by the service provider.

The premises 102 may be any type of user premises, such as homes, businesses, institutions, etc. The lines 101*a* may include components not shown, such as splitters, filters, amplifiers, etc. to help convey the signal clearly. Portions of the lines 101*a* may also be implemented with fiber-optics, while other portions may be implemented with other types of lines or wireless communication paths.

The local office 103 may include an interface, such as an interface 104 (e.g., termination system). More specifically, the interface 104 may be or include a cable modem termination system (CMTS), which may be a computing device configured to manage communications between devices on the network of lines 101*a* and backend devices such as the servers 105-108 (to be discussed further below). Backend devices such as the servers 105-108 may be located in close proximity to one another (e.g., in the same building) and/or far apart (e.g., separate cities, countries, etc.) and may be in communication with one another over various communication platforms, including over a cloud computing environment. The interface 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream channels or frequencies to be received by devices 110, such as modems, at the various access node devices 140*a* and 140*b* and other premises 102, and to receive upstream communications from the devices 110 on one or more upstream channels or frequencies.

The local office 103 may also include one or more network interfaces 170, which can permit the local office 103 to communicate with various other external networks 109. That is, the network interface 170 may include circuitry needed to communicate with one or more external networks 109 and their corresponding devices. These external networks 109 may include, for example, networks of Internet devices, telephone networks, cellular telephone networks, fiber optic networks, local wireless networks (e.g., WiMAX), satellite networks, and any other desired network. For example, the external network 109 may include a cellular telephone network/device 150 and one or more corresponding devices 151 (e.g., a mobile device, etc.). The external network 109 may also communicate with other devices and services, such as device 161 (e.g., server, database, etc.). According to some aspects, the device 151 and the device 161 may be foreign to the network 100, such that the devices 151 and 161 might not be provisioned on or otherwise have partial, limited, or no access to network resources associated with the network 100.

As noted above, the local office 103 may include a variety of servers 105-108 that may be configured to perform various functions, including providing content to the access node devices 140*a* and 140*b* and other premises 102, the devices 151 and 161, and other devices on the external networks 109. For example, the local office 103 may include one or more push notification servers 105. The push notification server 105 may be one or more computing devices that may generate push notifications to deliver data and/or commands to various access node devices 140*a* and 140*b* and other premises 102 and devices in the network (or more specifically, to the devices in access node devices 140*a* and 140*b* and to other premises 102 that are configured to detect such notifications), including, for example, a security system that will be discussed in connection with FIG. 4 and/or various wired and/or wireless devices. The local office 103 may also include one or more content servers 106. The content server 106 may be one or more computing devices that are configured to provide content to users at the access node devices 140*a* and 140*b* and/or the premises 102. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The local office 103 may also include one or more application servers 107. An application server 107 may be one or more computing devices configured to offer any desired service, and may run various languages and operating systems (e.g., servlets and JSP pages running on Tomcat/ MySQL, OSX, BSD, Ubuntu, Redhat, HTML5, JavaScript, AJAX and COMET). For example, an example application server 107 may be responsible for collecting data such as television program listings information and generating a data download for electronic program guide listings. An example application server 107 may be responsible for monitoring user viewing habits and collecting that information for use in selecting advertisements. An example application server 107 may be responsible for formatting and inserting advertisements in a video stream being transmitted to the access node devices 140*a* and 140*b* and other premises 102. An example application server 107 may be responsible for receiving user remote control commands, and processing them to provide an intelligent remote control experience. An example application server 107 may be responsible for receiving and transmitting communications related to a security system in accordance with the present disclosure.

In addition, the local office 103 may include one or more node location servers 108 to receive data (e.g., wireless coverage data, global positioning system (GPS) data, signal strength data, etc.) collected by various deployed access node devices. The node location server 108 may analyze the collected data to generate estimate locations of access points unknown to the node location server 108 and to estimate coverage data (e.g., maps) of the area. In performing these functions, the node location server 108 may also request, collect, store, and analyze various data from the access node devices 140a and 140b including system information (e.g., maps), and/or wireless (e.g., Wi-Fi) received signal strength indicator (RSSI) levels, SSID, communication channel information, and device identifier information of access points operating in the area.

Although shown separately, one of ordinary skill in the art will appreciate that the push server 105, the content server 106, the application server 107, and the node location server 108 may be combined and/or there may be more than one of each. Further, here the push server 105, the content server 106, the application server 107, and the node location server 108 are shown generally, and it will be understood that they may each contain memory storing computer executable instructions to cause a processor to perform steps described herein and/or memory for storing data, which may include security system access information, restrictions, and access logs as a result of performing steps and aspects described herein.

Example premises 102a and 102b (e.g., two of premises 102) may include an access node device 140a or 140b. The access node devices 140a and 140b can include any communication circuitry needed to allow a device to communicate on one or more links 101 with other devices in the network. The access node devices 140a and 140b may comprise a device 110, such as a modem, which may also include transmitters and receivers used to communicate on the lines 101a and with the local office 103. The device 110 may be, for example, an embedded digital voice adapter (eDVA), an embedded multimedia adapter (eMTA), a coaxial cable modem (for coaxial cable lines 101), a fiber interface node device (for the fiber optic lines 101), twisted-pair telephone modem, cellular telephone transceiver, satellite transceiver, local Wi-Fi router or access point, or any other desired modem device. Network 100 may include a plurality of devices 110 (e.g., modems) operating in parallel may be implemented within the access node devices 140a or 140b. The device 110 may be in communication with, or be a part of, a gateway interface device 111.

The gateway interface device 111 may be a computing device that communicates with the device 110 to allow one or more other devices at the premises 102a (e.g., via a premises or in-home network 180a) and one or more other devices at the premises 102b (e.g., via a premises or in-home network 180b) to communicate with the local office 103 and other devices beyond the local office 103, such as those devices in communication with the external networks 109. In some embodiments, the gateway interface device 111 may operate to communicate with devices 112-117 and devices 118-119, and may facilitate communications between devices 112-117 and devices 118-119. The gateway interface device 111 may be a set-top box (STB), a digital transport adapter (DTA), a digital video recorder (DVR), computer server, or any other desired computing device. The gateway interface device 111 may also include local network interfaces (not shown) to provide communication signals to devices 112-117 at the premises 102a and to devices 118 and 119 at premises 102b. The devices located at premises 102a and 102b may include devices such as display devices 112 (e.g., televisions), additional STBs or DVRs 113, personal computers 114, laptop computers 115 and 119, wireless devices 116 (e.g., wireless routers, wireless laptops and netbooks, notebooks, tablets, cordless phones, mobile phones, mobile televisions, personal digital assistants (PDAs), etc.), landline phones (e.g. Voice over Internet Protocol—VoIP phones), smart devices 117 and 118 (e.g., smart watches, smart attire, smart appliances, smart thermostats, light fixtures, light bulb, motion sensors, temperature/atmospheric monitors, window security sensors, personal activity sensors, video cameras, ambient light sensors, passive infrared sensors, humidity sensors, temperature sensors, carbon dioxide sensors, carbon monoxide sensors, and other computing devices, etc.), ZigBee devices (e.g., door sensors, window sensors, etc.), and any other desired devices. Examples of the local network interfaces may include Multimedia Over Coax Alliance (MoCA) interfaces, ZigBee, Ethernet interfaces, universal serial bus (USB) interfaces, wireless interfaces (e.g., IEEE 802.11), Bluetooth interfaces, scientific protocols, thread protocol, near field communication (NFC) protocol, cellular protocols (3G, 4G, LTE, etc.), satellite, DSL, light/fiber optic, Ethernet, and others.

Figure 2:
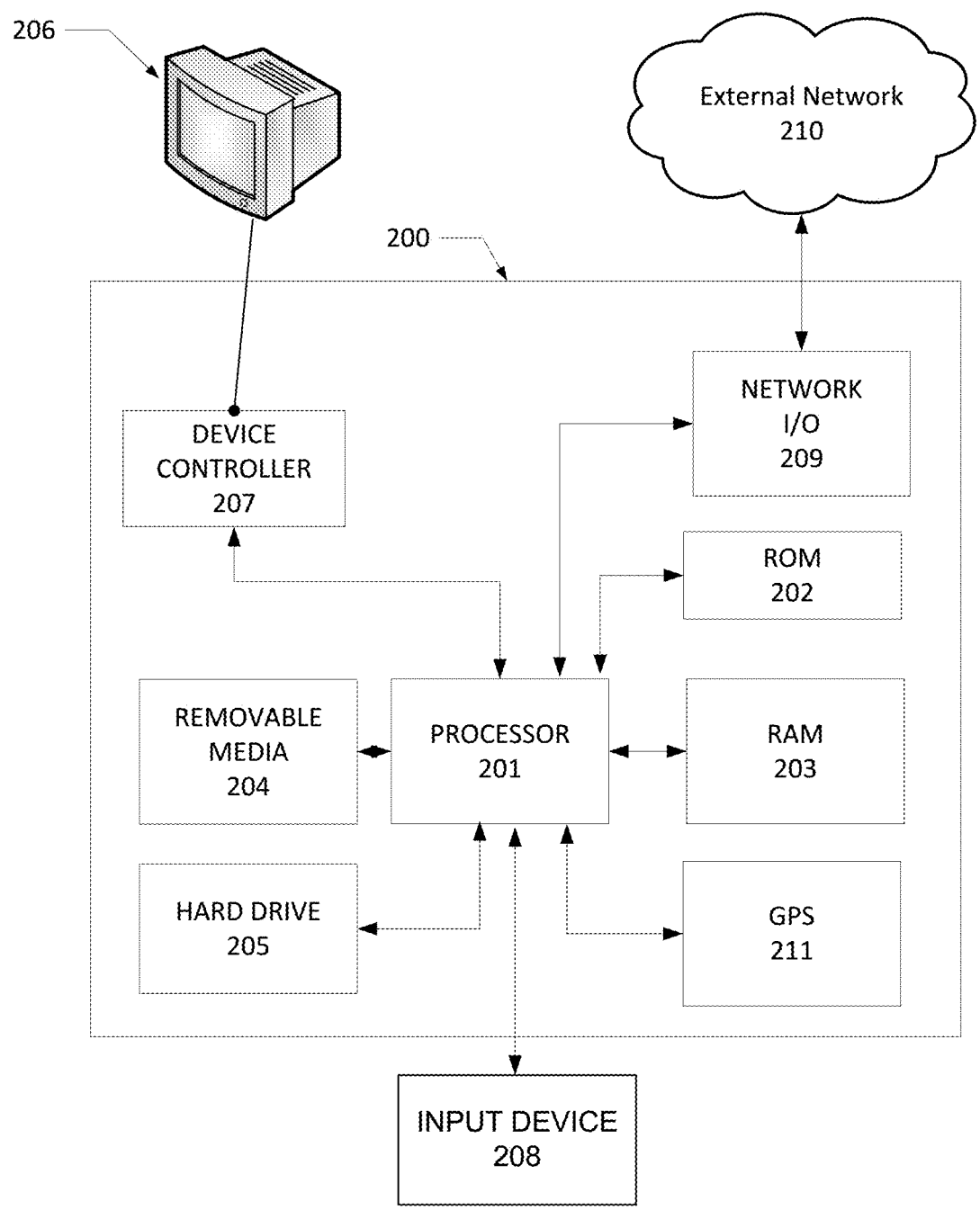
FIG. 2 shows an example computing device that can be used to implement any of the methods, servers, entities, and computing devices described herein.

FIG. 2 shows general hardware elements that can be used to implement any of the various computing devices discussed herein. The computing device 200 may be one of the devices shown in FIG. 1 and may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, removable media 204, such as a Universal Serial Bus (USB) drive, compact disk (CD) or digital versatile disk (DVD) drive, and/or floppy disk drive, or any other desired electronic storage medium. Instructions and/or other data may also be stored in an attached (or internal) hard drive and/or data repository 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (e.g., a network card) to communicate with a network 210. The network interface 209 may be a wired interface, wireless interface, or a combination of the two. In some embodiments, the network interface 209 may include a device (e.g., a cable modem), and the network 210 may include the communication lines 101a discussed above, the external network 109, an in-home network, a provider's wireless, coaxial, fiber, or hybrid fiber/coaxial distribution system (e.g., a DOCSIS network), or any other desired network, such as Multimedia Over Coax Alliance (MoCA) interfaces, ZigBee, Ethernet interfaces, universal serial bus (USB) interfaces, wireless interfaces (e.g., IEEE 802.11), Bluetooth interfaces, scientific protocols, thread protocol, near field communication (NFC) protocol, cellular protocols (3G, 4G, LTE, etc.), satellite, DSL, light/fiber optic, Ethernet, and others. Additionally, the device may include a location-detecting device, such as a global positioning system (GPS) microprocessor 211, which can be configured to receive and process global positioning signals and determine, with possible assistance from an external server and antenna, a geographic position of the device. One or more computing devices discussed herein may include some or all of the components discussed in FIG. 2, along with additional components.

In addition to the examples of the term access node device (e.g., the access node devices 140a and 140b) provided above, the terms access device, wireless access node device, access point or wireless access point may also refer to one or more devices at the premises 102 including, for example, an interface device, the device 110 (e.g., a cable modem such as an eMTA and/or a wireless router to provide a Wi-Fi hotspot), the gateway interface device 111, or any other computing device discussed in connection with the premises 102a or the premises 102b.

The example shown in FIG. 2 is a hardware configuration, although the components shown may be implemented as software as well. Modifications may be made to add, remove, combine, divide, etc. components of the computing device 200 as desired. Additionally, the components shown may be implemented using basic computing devices and components, and the same components (e.g., the processor 201, the ROM storage 202, the display 206, etc.) may be used to implement any of the other computing devices and components described herein. For example, the various components herein may be implemented using computing devices having components such as a processor executing computer-executable instructions stored on a computer-readable medium, as shown in FIG. 2. Some or all of the entities described herein may be software based, and may co-exist in a common physical platform (e.g., a requesting entity can be a separate software process and program from a dependent entity, both of which may be executed as software on a common computing device).

Figure 3:
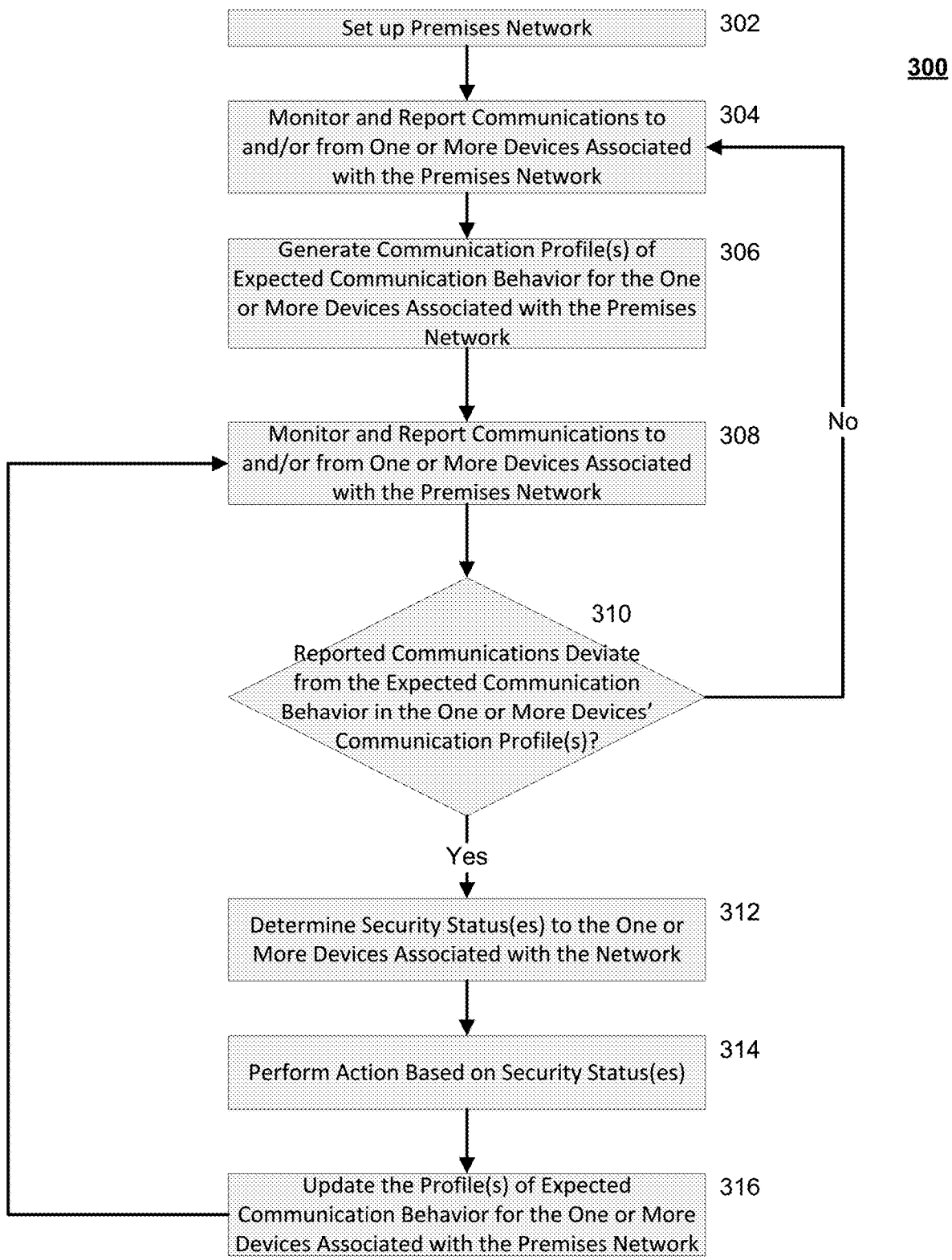
FIG. 3 shows a flow diagram of a method in accordance with aspects of the present disclosure.

FIG. 3 shows an exemplary flow diagram illustrating an example process 300 in accordance with one or more disclosed features described herein. In one or more embodiments, the process shown in FIG. 3 and/or one or more steps thereof may be performed by one or more computing devices and/or entities (e.g., components or devices of the network 100, components or devices associated with the external networks 109 or 210, the computing device 200, devices or components of and/or associated with the local office 103 or other entity, one or more content providers, and the like). In other embodiments, the process 300 shown in FIG. 3 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

At step 302, a premises network 180a may be provided and/or setup at a premises 102a. According to some examples and/or embodiments, the access node device 140a may provide and/or establish the premises network 180a. The access node device 140a may communicate with and/or associate with, via the premises network 180a, one or more devices at that premises 102a. The access node device 140a may provide to these connected devices at premises 102a a connection to the local office 103 and access to the network resources of the network 100. The access node device 140a may detect and/or monitor communications to or from any of the devices in communication with (e.g., within or associated with) the premises network 180a.

At step 304, the access node device 140a may monitor communications to and/or from one or more devices in communication with the premises network 180a, such as described above with respect to step 302. For example, the access node device 140a may determine that mobile device 116 may be sending messages (e.g., packets of information) or other communications (e.g., voice data, etc.) to the computing device 114 via the premises network 180a (e.g., via the access node device 140a), and may monitor these communications over time. In addition, the access node device 140a may also determine that the mobile device 116 may be receiving messages or communications from the computer 114 via the premises network 180a (e.g., via the access node device 140a), and may monitor these communications over time.

In other aspects, the access node device 140a may detect and/or monitor communications between devices that may be located outside of the premises network 180a (e.g., devices that might not be associated with premises network 180a, such as the devices 118, 119, 150, 151, 161, etc.) and the devices within the premises network 180a (e.g., devices that may be associated with the premises network, such as the devices 112-117). For example, the access node device 140a may determine that mobile device 116 may be sending messages or communications (e.g., packets of information) to the laptop 119, which may be in communication with a different access node device 140b via a different premises network 180b. These communications may be transmitted via the network 100, such as via the line 101a or in other ways (e.g., wireless, satellite, etc.). The access node device 140a may monitor these communications. In addition, the access node device 140a may determine that the mobile device 116 may be receiving messages or communications from the laptop 119 (e.g., via the premises network 180b, via the access node device 140b, via the access node device 140a, and/or via the premises network 180a), and may monitor theses communications.

In other aspects, the access node device 140a may detect and/or monitor communications between devices that may be located outside of the network 100, such as devices in communication with the external networks 109 or 210. For example, the access node device 140a may determine that the mobile device 116 may be sending messages or communications to the device 151 or to the device 161 (e.g., via the premises network 180a, via the access node device 140a, via the network 100, and/or via the external network 109), and may monitor theses communications. In addition, the access node device 140a may determine that the mobile device 116 may be receiving messages or communications from the device 151 or the device 161, and may monitor these communications.

In one example scenario, a new device (e.g., a device that is not already in communication with the premises network 180a or otherwise unknown to the access node device 140a) may connect to, communicate with, and/or associate with the premises network 180a, and the access node device 140a may begin to monitor communications to and/or from this new device. For example, a user may connect or associate a smart device 117 (e.g., a smart thermostat) to the premises network 180a. The smart device 117 may start to communicate with other devices within the premises network 180a (e.g., the devices 112-116 and the access node device 140a). The smart device 117 may also start communicating with devices that might not be located within or in communication with the premises network 180a, such as the devices 140b, 118, 119, components of the local office 103, the devices 150, 151, 161, and the like.

The access node device 140a may detect and monitor communications between the smart device 117 and any of these other devices. For example, a user may use the mobile device 116 to send a message to the smart device 117 instructing the smart device 117 to change the temperature level at the premises 102a (e.g., a house) from 73 degrees to 75 degrees. After receiving that message, the smart device 117 may send a message (e.g., a confirmation or acknowledgement message, etc.) back to the mobile device 116. The access node device 140a may monitor these communication exchanges and may send information related to these communication exchanges to the local office 103 (or to some other entity), which may store the information in a server, database, etc.

Alternatively or additionally, the smart device 117 may send usage statistics (e.g., how often the device is being used, information on other devices with which the smart device 117 communicates, etc.) or other information to a device (e.g., a computing device, a server, some service, etc.), such as the device 161, that may be outside of the network 100 or the premises network 180*a*. For example, a smart personal monitoring device 117 (e.g., health or fitness monitor) may communicate with an associated service provider that may operate a personal monitoring service or device (e.g., device 161) that communicates with or controls the device 117. The personal monitoring device 117 may transmit information such as user information, heartrate, sleep information, calories consumed or burned, etc. The personal monitoring service may receive, store, and/or process this information. The personal monitoring service may be associated with an external network, such as network 109 or network 210. The personal monitoring service may transmit software updates, firmware, operating instructions, or other information to the personal monitoring device 117. According to some aspects, the device 117 may communicate with the external service periodically, such as every 30 minutes, daily, etc. The device 117 may transmit this information via the premises network 180*a* and via network 100. According to some aspect, the personal monitoring service may be associated with the network 100 (e.g., may be a service or device within the network 100 or approved on the network 100). The access node device 140*a* may monitor these communication exchanges and may send information related to these communication exchanges to the local office 103 (or to some other entity), which may store the information in a server, database, etc.

According to some aspects, the access node device 140*a* may monitor and report communication exchanges for any of the devices in communication with the premises network 180*a* to the local office 103 (or other entity). According to some aspects, the access node device 140*a* may detect, monitor, and report characteristics or features of the communication exchanges. For example, the access node device 140*a* may detect and report to the local office 103 (or other entity) identifying information of any of the devices (e.g., location, IP address, type of device, MAC address, etc.), type of communication protocol used (e.g., wireless, cellular, wired, ZigBee, etc.), the size of the packets used in the communication exchange, the frequency of communications, a time associated with each communication, and the like.

At step 306, the local office 103 (or other entity) may generate a communication profile for a device (e.g., one of the devices 112-119). For example, the local office 103 may generate a device profile or device fingerprint based on the communication reports received for that device, such as transmitted by the access node device 140*a*. According to some embodiments, a communication profile may be based on one or more communication reports transmitted over a period of time. The communication profile may comprise an expected communication behavior of a particular device, and thus may act like or be a fingerprint for that particular device.

In some embodiments, the communication profile and expected communication behavior of a device may include information such as the identification of the devices with which a particular device typical exchanges communications. For example, the smart device 117 may send information via the access node device 140*a* to an external temperature service device 161 multiple times a day at regular intervals (e.g., every 5 minutes). Thus, the communication profile for that smart device 117 may indicate that the smart device 117 typically sends information to that external temperature service device 161 located at a particular location, IP address, MAC address, or some other device location identifier, etc. every 5 minutes.

Alternatively or additionally, the smart device 117 may typically communicate with the mobile device 116 in non-regular intervals (e.g., whenever a user wakes the mobile device, opens an associate application, turns on the device 116, etc.). In this example, the communication profile for the smart device 117 may indicate that the smart device 117 typically communicates with the mobile device 116 in non-regular intervals, and may also include identifying information for the mobile device 116. Alternatively or additionally, a smart sensor 117 (such as a window sensor) may communicate with the access node device 140*a* to transmit information to the local office 103. For example, the window sensor may be part of a security system and may transmit information indicating whether a window or door has been opened/closed, the length of time in a particular state, the time of day for each state, an activation state (e.g., armed or disarmed), etc. Thus, the communication profile for the smart sensor 117 may include that the smart sensor is typically in a particular state for an amount of time, etc. and may also include that the smart sensor 117 communicate with no other devices besides the access node device 140*a*.

The communication profile and the expected communication behavior of a device may also describe characteristics of the communication or protocol used, such as the typical size of the communication or the typical amount of data transmitted, such as the typical number of packets communicated between devices. For example, the communication profile may include a typical packet size of communications sent between devices, such as between the smart device 117 and the temperature service device 161, between the smart device 117 and the mobile device 116, and/or the smart device 117 (e.g., window sensor) and the access node device 140*a*. For example, the smart device 117 may communicate with a device external to the network via a ZigBee protocol with packet sizes of 104 bytes. Thus, the communication profile for the smart device 117 may indicate that this is a typical communication pattern for this smart device 117.

The communication profile and expected communication behavior of a device may also comprise a typical frequency and or time of the communications sent between devices, such as between the smart device 117 and the temperature service device 161 and/or between the smart device 117 and the mobile device 116. For example, a user may use the mobile device 116 to change the thermostat setting on the smart device 117 if the user leaves for work at 8:00 in the morning and if the user comes home from work at 6:00 in the afternoon. Thus, the communication profile for the smart device 117 may indicate that this is a typical communication pattern for the smart device 117, and the communication profile for the mobile device 116 may indicate that this is a typical communication pattern for the mobile device 116.

According to some aspects, the terms "typical" or "expected" may be described as any percentage, amount, value, threshold, etc. In one example, for a device that typically communicates with a device, the typical value or threshold may be set at 20% of all communications to or from other devices. Thus, for the communications between a first device and a second device, if these communications comprise 19% of the first device's total communications to or from devices, the second device might not be classified as a device that typically communicates with the first device (e.g., using the 20% threshold).

According to some aspects, the terms "typical" or "expected" may be described a varying percentage, amount, value, etc. For example, a user may have a part at the premises 102a and may have several other users at the premises 102a. These other users may have devices, which may communicate with (e.g., with permission) the access node device 140a or to any of the other devices (e.g., device 113), such as via a wireless signal. Thus, the communication profile of the device 113 may indicate that the device typically communicates with these other devices. Such a profile might not be based on a threshold situation as described above. In one example, the user may indicate or otherwise notify the local office that these other devices are allowed to communicate with the access node device 140a or the device 113. Alternatively or additionally, the local office 103 might determine whenever a device communicates with other devices with permission. Thus, the communication profile for the device 113 may include these other devices.

The communication profile for a particular device may also comprise and/or be based on a type of device. For example, the communication profile for the smart device 117 may indicate or be based on identifying information of the smart device 117. For example, if the smart device 117 is the first smart thermostat in communication with the premises network 180a, a communication profile for this type of device (e.g., that type of smart thermostat) may be developed based on communications associated with this smart device 117. Thus, a "baseline" communication profile may be determined for devices of a same or similar type of device as the smart device 117. If a similar type device connects to the premises network 180a (or other networks), the local office 103 and/or the access node device 140a may use the baseline communication profile for this type of device to determine if this device's monitored communications deviate from that communication profile of expected communication behavior associated with that type of device (deviation will be discussed below in more detail). In addition, the local office 103 may use a baseline communication profile for a type of device to determine if other devices of a same type within other premises networks (such as the premises network 180b) deviate from the communication profile of expected communication behavior associated with those types of devices.

According to some aspects, the communication profile and the expected communication behavior of a device may be based on communication reports from a plurality of devices (e.g., devices of a same or similar type, devices within the same premises network, similar geographically based devices, etc.) For example, if the smart device 117 and the smart device 118 are of a same or similar type (e.g., both a particular brand smart thermostat) and are in proximity to each other (e.g., in communication with the same cable plant or termination station), the local office 103 may generate a communication profile for this type of smart thermostat (or similar) for this particular proximity (e.g., for devices in communication with the same cable plant or termination system) based on the communication reports of the smart device 117 and the smart device 118. Thus, if another smart device of the same brand/type as the smart devices 117 and 118 communicates via the network 100 and is in this same proximity (e.g., in communication with the same cable plant or termination system as the smart devices 117 and/or 118), the local office 103 may assign or associate a communication profile similar to or the same as the communication profile for the smart device 117 or the smart device 118.

According to some aspects, a communication profile may already be known by the local office 103. For example, after identifying a device type, the local office 103 (or other entity) may have knowledge of (or otherwise be able to obtain) a known communication profile for that type of device. For example, a manufacturer of the smart device 117 may provide the local office 103 with a typical communication profile for that type of smart device 117, and the local office 103 may use this typical communication profile to determine whether communications to and/or from the smart device 117 deviate from this communication profile. Alternatively or additionally, the local office 103 may retrieve a communication profile from another source, such as from the internet, from a user, etc.

According to some aspects, the local office 103 may further modify a communication profile (e.g., a generated communication profile, a known communication profile, etc.) based on additional communication reports received over time. For example, the local office 103 may modify a communication profile in substantially real-time based on received communication reports. For example, a user may change their pattern of use of particular device(s) over time, and this may be reflected by updating the communication profile. In one exemplary situation, a user may initially communicate (e.g., via the mobile device 116) with a smart thermostat 117 not very often at first after the user initially installs/connects the smart thermostat 117 to the premises network 180a. This may be due to the user not being familiar with the device 117 and/or learning to operate the device 117. After a period of time, the user may increasingly communicate with and/or operate the device 117 with the mobile device 116, which may be due to the user becoming more familiar with the device 117 and the uses of the device 117. Thus, the communication profile for the device 117 (and likewise for the device 116) may reflect this gradual increase in use and the increased communications. In an additional example, the communications may increase until reaching a steady-state point, such as if a user has become adequately familiar with the device 117 and uses the device 117 in a regular manner. The communication profile may reflect this regular use and the corresponding communication pattern.

At step 308, the access node device 140a may continue to monitor and report the communications of the one or more devices in communication with (e.g., within) the premises network 180a. For example, the access node device 140a may continue to monitor any communications between the one or more devices that are in communication with the access node device 140a and/or devices that have communicated via the access node device 140a.

At step 310, the local office 103 (or other entity, access node device, device, etc.) may determine whether a device's communications (e.g., current or subsequent communications being received or transmitted) deviate from or conflict with the expected communication behavior in that device's communication profile. According to some aspects, an analytics engine device may be used to generate a data log of communications. The deviation may be based on any information or statistic in the communication exchange (e.g., as discussed herein and not explicitly discussed herein). For example, the local office 103 may determine the deviation based on identifying information for the typical devices in communication with a particular device, typical packet size of communications, typical frequency of communication, typical time of communication, typical size of the communication (e.g., number of packets), typical type of communication protocol, etc.

According to some aspects, a deviation in the expected or typical communication profile may be associated with an abnormality (e.g., malicious software installed on the smart device 117, unauthorized communication or control from outside the network 100 or 180a, etc.) For example, malware could be installed on a device at a factory or manufacturer. This device that has malware installed may be in communication with a premises network 180a and may pose a threat to the premises network 180a, such as by sending information from within or inside the premises network 180a (e.g., information from other devices within the premises network 180a) to a third-party device or entity that may be unknown or unauthorized (e.g., not associated) by the local office 103. For example, a smart device 117 may be sending to unknown or unauthorized devices unauthorized information (e.g., personal information, phone contacts, email addresses, financial information, etc.) that the smart device 117 may have retrieved from other devices in communication with the network 180a. These unknown or unauthorized devices may be associated with an IP address or MAC address (or other identifier) outside of or not associated with the network 100.

In one example, if the communication profile of the smart device 117 indicates that the smart device 117 typically communicates with the mobile device 116 and with the external service device 161, the local office 103 may determine a deviation from this communication profile if the smart device 117 begins to communicate with a device that is not the mobile device 116 or the device 161, such as the set-top receiver 113 or with the device 151. Alternatively or additionally, a temperature sensor/monitor (e.g., device 117) may typically send information through the access node device 140a to an outside temperature service/device. If that temperature monitor begins to communicate with a cellphone (e.g., device 116) in communication with the home network, this subsequent communication with the cellphone may be flagged as abnormal.

Alternatively or additionally, a deviation may occur if the communication profile may indicate a typical packet size a device uses to communicate. For example, if the communication profile for the smart device 117 indicates that the smart device typically communicates with 104 byte sized packets, the local office 103 (or other device) may determine that a deviation has occurred if the smart device 117 begins communicating with packets that are of a different size than 104 bytes, such as 128 byte sized packets. In some embodiments, a device may typically use a first packet size (e.g., 120 bytes) if communicating with a first device and may typically use a second packet size if communicating with a second device (e.g., 122 bytes). In such cases, the deviation may be determined based on typical communications with a particular device (or with a particular type of device).

Alternatively or additionally, the deviation may be based on a typical frequency of communications or based on a time of day or time period. For example, a motion sensor light device (e.g., device 117) may typically communicate more data at night than during the day. If the local office 103 determines that an increased amount of data communication is being communicated to or from the motion sensor device during the day, this activity may be flagged and/or a deviation from an associated communication profile may have occurred.

Alternatively or additionally, a manufacturer of the smart device 117 may provide the local office 103 with a typical communication profile for that type of smart device 117, and the local office 103 may use this typical communication profile (e.g., by comparison, etc.) to determine whether communications to and/or from the smart device 117 deviate from this communication profile. The local office 103 may determine that a deviation from this communication profile has occurred (or is occurring) if the device begins communicating with devices or in a manner not consistent with the manufacturer-provided profile. Alternatively or additionally, the local office 103 may retrieve a communication profile from another source, such as from the internet, from a user, etc.

Another example of deviation may include deviation from a typical communication protocol, such as ZigBee. For example, if the smart device 117 typically uses particular ZigBee cluster libraries to communicate with a device and deviates from using these cluster libraries by using a different combination of cluster libraries, the smart device 117 or the device to which the device is communicating may be flagged as suspicious. According to some aspects, the deviation from the expected communication behavior may be some pre-determined value or percentage.

According to some embodiments, the deviation may be based on any combination of factors (such as the factors and examples discussed herein). For example, if the communication profile of a device comprises a plurality of different factors, the local office 103 (or other entity) may determine whether a deviation in communication for a device has occurred based on one or more of the factors in the device's communication profile. According to some aspects, different weights may be assigned or determined for different factors. For example, if the smart device 117 typically uses 104 byte sized packets to typically communicate with the device 161, the local office 103 (or other entity), in one situation, may determine that a deviation may give more weight to the typical packet size factor than to the identity of the device 161. The local office 103 may weigh the packet size more because the local office 103 may determine that the smart device 117 might not normally communicate with a packet size of a different size, but the smart device 117 may communicate with another device besides device 161. Such situations may happen when, for example, the device 161 might be replaced with a different device (e.g., changing from one server to a different server, etc.) According to some embodiments, the deviation may be based on a threshold level of deviation. For example, if the deviation does not meet a predetermined threshold deviation, the local office 103 may determine that a deviation might not have occurred. If the deviation does meet the threshold deviation, the local office 103 may determine that a deviation may have occurred.

If the local office 103 determines that communications associated with a device might not deviate from that device's expected communication behavior in that device's communication profile, the process 300 may return to step 308, where the access node device 140a may continue to monitor for communications (e.g., at step 304) and may modify or create a new communication profile for a device (e.g., at step 306).

According to some aspects, the local office 103 (or other entity) may classify a device as a whitelisted device or may assign the device to a list of approved or validated devices after determining that the device's communications might not deviate from the device's expected communication behavior in that device's communication profile. According to some aspects, after a device is whitelisted, approved, validated, etc., the local office 103 or the access node device 140a (or other entity) may remove one or more limitations (e.g., network limitations, etc.) placed on or associated with that device, such as access to a service associated with the network. For example, if a new device connects to the premises network 180a, the local office 103 may initially limit the network access of such a device until the local office 103 can determine whether the communications associated with that new device correlate to or match (e.g., not deviate from) a communication profile associated with that device (e.g., which may be determined by the local office 103, previously known from the manufacturer, determined from a similar type device communication profile generated based on other similar types of devices, etc.). After determining that the communications associated with that new device might not deviate from the expected communication behavior associated with that new device, the local office 103 or the access node device 140a may remove one or more of the network limitations placed on that device.

According to some aspects, the local office 103 (or other entity) may classify a device as a blacklisted device or may assign the device to a list of malicious, non-approved, non-validated, etc. devices after determining that the device's communications may deviate from the device's expected communication behavior in that device's communication profile. According to some aspects, if the communications associated with a malicious device (e.g., a device having a communication behavior that deviates from an expected communication behavior) begin to conform or begin to align with a communication profile for that device (e.g., not deviate from the communication profile in subsequent communication exchanges, such as determined by monitoring the communications associated with that device), the local office 103 or the access node device 140a (or other entity) may reclassify the device (e.g., change from malicious to possibly malicious, from possibly malicious to neutral, from neutral to whitelisted or approved, etc.). According to some aspects, the local office 103 might not reclassify the device, and instead may take immediate action (such as discussed below in more detail).

If the local office 103 does determine that communications associated with a device may deviate from that device's expected communication behavior in that device's communication profile, the process 300 may continue to step 312.

At step 312, the local office 103 (or other entity) may determine and/or assign (or otherwise associate) a security status or security level to a device based on the determined or detected deviation of that device's communications from that device's expected communication behavior in the device's communication profile. According to some embodiments, the security status or level may be based on how much deviation from a communication profile is associated with monitored communications of a device. For example, if a device continuously deviates from the communication profile (e.g., above a threshold), drastically deviates from the communication profile (e.g., above a larger threshold), or the like, the local office 103 may associate this device as being malicious or posing a threat to the networks 100 or 180a or to other devices. According to some aspects, the local office 103 (or other entity) may blacklist a malicious device or a threatening device. Alternatively or additionally, if the deviation is less frequent or if the deviation is less drastic, the local office 103 may associate this device as being possibly malicious or posing a possible threat to the networks 100 or 180a or to other devices. According to some aspects, the local office 103 (or other entity) may greylist a possibly malicious or possibly threatening device. Alternatively or additionally, if the deviation is less than a threshold, the local office 103 may associate this device as being non-malicious, and may whitelist the device.

At step 314, the local office 103 (or other entity), the access node device 140a, or a user may perform an action based on the security status of a device. For example, if the smart device 117 is determined to be blacklisted or malicious, the local office 103 or the access node device 140a may block one or more communications to or from the smart device 117, such as communications to or from other devices within the premises network 180a, or communications to or from devices outside of the premises network 180a.

Alternatively or additionally, if the smart device 117 is determined to be blacklisted or malicious, the local office 103 or the access node device 140a may limit, restrict, or filter communications to or from the smart device 117. Alternatively or additionally, if the smart device 117 is determined to be greylisted, the local office 103 or the access node device 140a may block one or more communications to or from the smart device 117, such as communications to or from other devices within the premises network 180a, or communications to or from devices outside of the premises network 180a. According to some aspects, the number of blocked communications for a greylisted device may be less than the number of communications for a blacklisted device. Alternatively or additionally, if the smart device 117 is determined to be greylisted, the local office 103 or the access node device 140a may limit, restrict, or filter communications to or from the smart device 117, but may grant more communications for this greylisted device than for a blacklisted device. For example, if a greylisted smart device 117 is communicating with a device known by the local office 103 to be non-malicious (e.g., whitelisted device), the local office 103 may allow this communication exchange. However, if the greylisted smart device 117 is communicating with a device known to be malicious (e.g., blacklisted) and/or not otherwise known by the local office 103, the local office 103 may limit or block the communication exchange.

According to some aspects, the devices that a particular device communicates with may be blacklisted, greylisted, or whitelisted. For example, if the communication profile for the smart device 117 indicates that the smart device 117 typically communicates with the device 161, the device 161 (or an associated address or location) may be whitelisted for communicating with the smart device 117. According to some embodiments, the device 161 might not be whitelisted for other devices besides the smart device 117, unless the local office 103 determines that the device 161 is whitelisted for other devices. According to some embodiments, the local office 103 may whitelist a device (e.g., such as device 161) to communicate with any device associated with the network 100 or the network 180a.

In one example scenario, the device 161 may send an update to the smart device 117, such as an update or firmware update, and this update communication may include a lot of information, may be sent at a non-typical time, or otherwise deviate from the expected communication behavior in the communication profile of the smart device 117. Because the device 161 is on the whitelist, the update communication may be allowed through by the local office 103 and/or the access node device 140a (this will be discussed below in more detail). Thus, if a non-whitelisted device tries to communicate with the smart device 117, the local office 103 or the access node device 140a may limit or block such a communication or may alert a user (e.g., via an electronic message, telephone call, other correspondence, etc.) to such a communications to allow the user to decide whether to limit, accept, or deny it. According to some aspects, the local office 103 or the access node device 140*a* may alert the user if a device tries to set up a VPN connection to another device.

According to some aspects, the local office 103 or the access node device 140*a* may notify or alert a user (e.g., a user associated with a device within the premises network 180*a*) of suspicious activity associated with a device (e.g., if communications deviate from expected communication behavior). For example, the local office 103 (or other entity) may communicate with a user or with a device associated with the network 100 via an electronic message, telephone call, other correspondence, etc. For example, the local office 103 may transmit a message or warning to a user or to a device in communication with the network 100 or premises network 180*a* alerting the user of a possible malicious device. The user may inform the local office 103 (e.g., via an electronic message, telephone call, other correspondence, etc.) of whether that communication or device should be allowed, limited, blocked, etc. According to some aspects, the notification may be an alarm (such as discussed below with respect to FIG. 4).

According to some embodiments, a device associated with the network 100 may be affiliated with, registered with, or otherwise be associated with another device (e.g., another device associated with the network 100, a device that might not be associated with the network, etc.). In one example, a user may register a device (e.g., the smart device 117) with a tracking service (e.g., device 151), which may be configured to receive information (e.g., usage communications or data) from the smart device 117. The communication profile of the smart device 117 might not indicate that the smart device 117 typically communicates with the device 151 and/or the device 151 may be blacklisted or greylisted. Thus, whenever the smart device 117 begins to communicate with the device 151 (e.g., because the user signed up for this tracking service), the local office 103 and/or the access node device 140*a* may determine that the communication behavior of the smart device 117 deviates from the expected communication behavior in the communication profile of the smart device 117. Thus, communication with the device 151 may be flagged as suspicious by the local office 103 (or other entity). The local office 103 may notify (e.g., via a user interface, an application, an email, a telephone call, or otherwise) a user associated with the smart device 117 (e.g., associated via an account with the local office 103, registered with the local office 103, etc.) of this device 151, the communication with the device 151, and/or that the smart device 117 may be acting suspiciously (e.g., deviating from the expected communication behavior). The user may be able to inform or notify the local office 103 (e.g., via the user interface, email, telephone, or otherwise) of whether the user knows, approves, might not know, might not approve, etc. of the smart device 117 communicating with the device 151. According to some aspects, if the user approves the communication with the device 151, the device 151 may be re-classified (e.g., moved to a whitelist or greylist) by the local office 103, the communication profile of the smart device 117 may be updated by the local office 103 to reflect this approval of device 151, and/or the local office 103 may allow the communication exchange to happen. According to some aspects, if the user might not approve the communication with device 151, the device 151 may remain blacklisted or greylisted, the device 151 may be reclassified (e.g., moved to a greylist or blacklist) by the local office 103, the communication profile of the smart device 117 may be updated by the local office 103 to reflect this disapproval of the device 151, and/or the communication exchange may be blocked or limited. According to some aspects, these actions may occur automatically in response to a user approval or disapproval. According to some embodiments, these actions may include modifying, expanding, granting, revoking, or keeping the same one or more network permissions associated with a device or with a portion of the network 100 (e.g., a premises, two or more devices, a link, etc.).

At step 316, the local office 103 (or other entity) may update the communication profile of the device (e.g., smart device 117) based on any of the aspects disclosed herein. For example, the local office may update the communication profile of a device based on or to reflect the assigned security status of the smart device 117 (e.g., at step 312), any actions performed (e.g., at step 314), whether any associated device is classified as malicious or suspicious, an associated threat level (e.g., whitelisted, greylisted, blacklisted, etc.), or on any other features described herein. The process may return to step 308, where the access node device 140*a* may continue to monitor behavior of one or more devices within the premises network 180*a*. The process 300 may end at any time and/or after any step.

Figure 4:
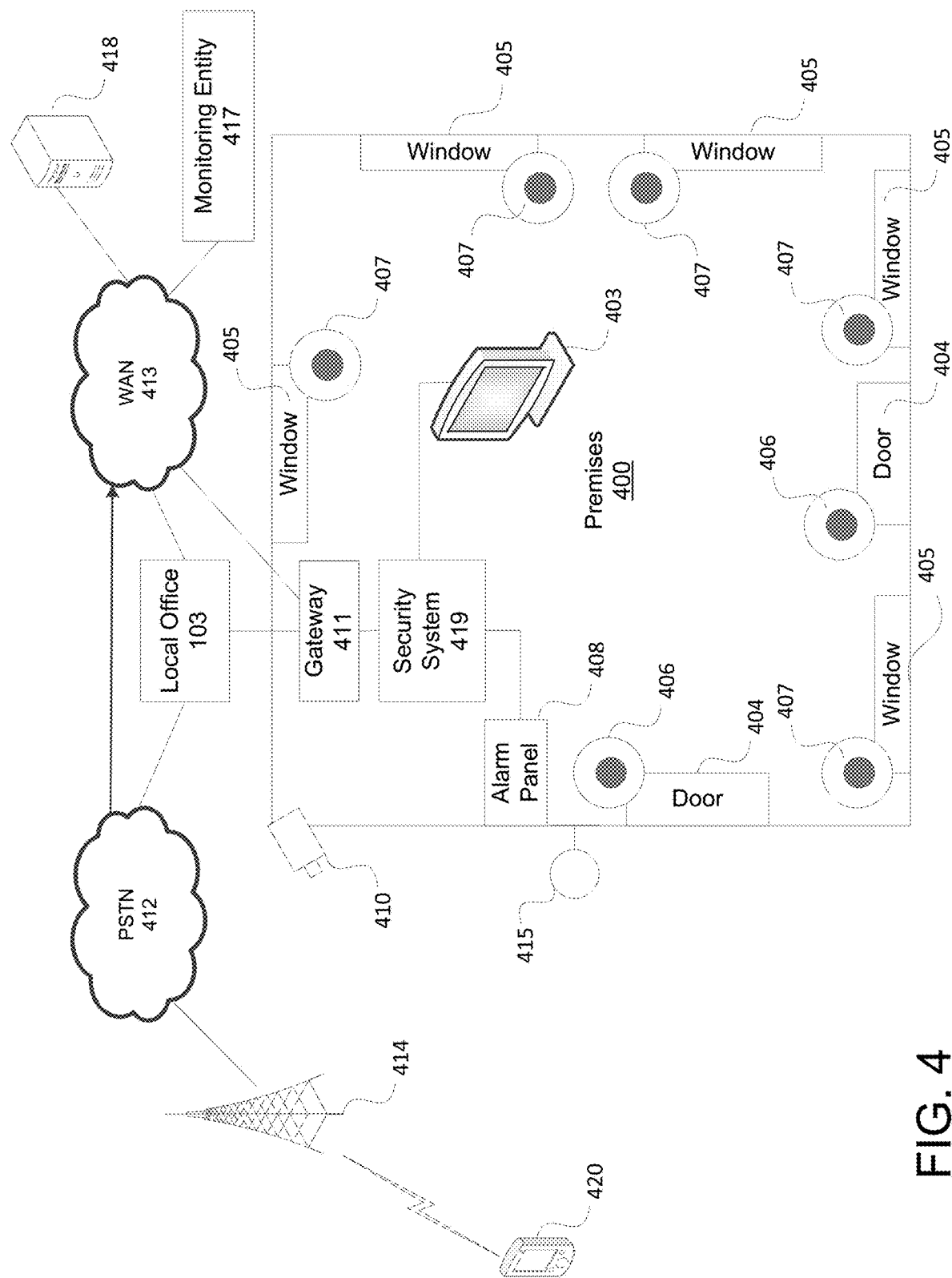
FIG. 4 shows an example operating environment in accordance with aspects of the present disclosure.

FIG. 4 shows an example operating environment in which various features described herein may be performed and implemented. The environment may include components and devices that are associated with providing a security monitoring service that, for example, monitors the security of a premises 400 (which may be or may correspond to one of the premises 102*a* and/or 102*b* of FIG. 1), such as a user residence, business, recreational facility, etc. Any of the devices and/or components of FIG. 4 may be any of the devices and/or components as shown in FIGS. 1 and 2. For example, premises 400 may be part of the network 100.

FIG. 4 shows one example of components and devices associated with providing a security monitoring system. The premises 400 may include a number of entry points that are to be monitored by a security system 419 and various other security components (e.g., security sensors 406 and 407, cameras 410, lights 415, alarm panel 408, etc.). The entry points may be referred to herein interchangeably as a node. Each entry point or node, as shown in FIG. 4, corresponds to one of the doors 404 or windows 405 of the premises 400. According to some aspects, the security system 419 may be part of the gateway 411 (which may be similar to or the same as the access node devices 140*a* and/or 140*b* in FIG. 1).

Each entry point or node may be monitored by one or more sensors, such as security sensors 406 and 407. Each security sensor may be communicatively coupled to the security system 419. For example, as shown in FIG. 4, each entry point that is a door may have one or more sensors 406 for monitoring a door. Each entry point that is a window may have one or more sensors 407 for monitoring a window. Security system 419 (e.g., via the gateway 411) may be able to receive or otherwise monitor data from any of the components of FIG. 4, such as the security sensors 406 and 407, in accordance with the aspects discussed herein (e.g., with reference to the process of FIG. 3). In some arrangements, the security sensors 406 for monitoring a door may be a different combination of sensors than the security sensors 407 for monitoring a window (e.g., a door may be provided with a switch sensor that is different than the types of sensors provided for the windows). However, in some variations, the security sensors 406 for monitoring a door may include one or more of the same types of sensors as the security sensors 407 for monitoring a window (e.g., each door and each window is provided with at least one sensor that includes an accelerometer, a magnetometer, and/or a pressure sensor).

A security sensor may be of any type suitable for monitoring some aspect of an entry point or the premise. A security sensor may be a smart device, such as the smart device 117. Non-limited examples of security sensors include video cameras, microphones, ambient light sensors, passive infrared sensors, humidity sensors, temperature sensors, carbon dioxide sensors, carbon monoxide sensors, seismic sensors, pressure sensors, seismometers, magnetometers, accelerometers, gyroscopes, or the like.

While the description herein is primarily directed to the monitoring of entry points/nodes that are doors and windows, other types of nodes may be monitored by one or more security sensors (e.g., traffic areas, exterior locations, and the like). For example, the premises 400 may also include additional security sensors that might not be located at a specific entry point or node. As shown in FIG. 4, one or more cameras 410 may be placed at various locations at, around, in, and/or near the premises 400, such as a traffic area of the premises 400 (e.g., video camera 410 may be placed to monitor a hallway) or an exterior area of the premises 400 (e.g., a porch area or driveway area of the premise 400). According to various aspects disclosed herein, images, sounds, and other data captured by a camera 410 or other sensors of may be transmitted and monitored by the security system 419 (e.g., via the gateway 411), for example, as an email, text message, or through a software application to, for example, a remote or local user or device, for analysis and/or a predetermined and/or dynamically determined action.

One or more lights 415 may be located throughout the premises 400 so as to illuminate an entry point of the premises 400, such as a door 404 or a window 405, or other traffic areas of premises 400 (e.g., a hallway or an exterior location). According to some aspects, the one or more lights 415 may be similar to or may be the smart device 117. According to various aspects disclosed herein, the security system 419 may be configured to control the one or more lights 415 to be on or off (e.g., the one or more lights 415 may be controlled to be on as part of a response to a triggered alarm or to strobe on and off as part of the response). According to some embodiments, the lights 415 may be monitored by the security system 419 (e.g., via the gateway 411) in accordance with the features described herein.

The security system 419 may be configured to control, monitor and/or receive from the various security components depicted in FIG. 4, including the various security sensors 406 and 407, the one or more lights 415, and the one or more cameras 410. The security system 419 may be configured to place the security components in various states (e.g., deactivate a sensor, activate a sensor, disarm a sensor, arm a sensor, etc.). For example, the security system 419 may be configured to place the security components in various states based on an associated communications profile and on monitored communications to and/or from the security components. A user may be able to interact with the security system 419 to configure the state of the various security components and the state of the security system 419. In one arrangement, an alarm panel 408 may be implemented in proximity to and/or as part of the security system 419, and the user may interact with the alarm panel 408 to configure the state of a security component.

The various states for the security system 419 and the security components depicted in FIG. 4 may include an armed state (e.g., alarms can be raised), a disarmed state (e.g., alarms are not raised), a disabled state (e.g., power is turned off and/or monitoring is not performed) and an active state (e.g., power is turned on and/or monitoring is performed). For example, the user may arm the security system 419, arm specific entry points (e.g., arm the sensors for a door 404), arm specific security sensors (e.g., arm one or more of the security sensors 406), deactivate various security sensors (e.g., activate camera 410), and the like.

If the security system 419 or various security components are in an armed state, the security system 419 may trigger or raise an alarm based on various conditions. For example, the security system 419 may be monitoring data, communications, and/or signals that are received from or transmitted to one or more of the security sensors and, based on the data and/or signals, may determine to raise an alarm (e.g., such as described herein). As one particular example, a switch sensor may include a circuit that opens or closes in response to an entry point (e.g., door 404 or window 405) being opened and the switch sensor may transmit a signal indicating whether the circuit is open or closed to the security system 419. The security system 419 may trigger an alarm upon receiving the signal (e.g., an alarm may be triggered if the sensor transmits the signal to the security system 419; or an alarm may be triggered if the signal indicates the circuit is open, which occurred responsive to the entry point opening). As another particular example, a magnetometer may be sending magnetic wave data for the entry point to the security system 419 and the security system 419 may trigger an alarm based on an analysis of the magnetic wave data (e.g., an alarm may be triggered if the sensor transmits data to the security system 419; an alarm may be triggered if the magnetic wave data indicates a magnetic field change above a threshold amount; or an alarm may be triggered if the magnetic wave data, as compared to a historical record of magnetic wave data for that entry point, is determined to be irregular). As a further particular example, a pressure sensor (such as those described below in connection with FIGS. 8A and 8B) may be sending pressure data for the entry point to the security system 419 and the security system may trigger an alarm based on an analysis of the pressure date (e.g., an alarm may be triggered if the sensor transmits data to the security system 419; an alarm may be triggered if the pressure data indicates a pressure below a threshold amount; or an alarm may be triggered if the pressure data, as compared to a historical record of pressure data for that entry point, is determined to be irregular).

According to some aspects there may be numerous other ways in which the security system 419 can be configured to determine whether to trigger an alarm. For example, the security system 419 may be configured to trigger an alarm if predefined criteria are satisfied. In some variations, the predefined criteria may be user defined or based on behavioral patterns learned by the security system 419. For example, the user may configure the security system 419 to analyze video received from video sensors that are monitoring one or more of the entry points, compare faces detected from the video to one or more faces of people that are allowed to enter the premise 400, and determine whether to raise an alarm based on the comparison. As one example, the user may configure the security system 419 with pictures of family members' faces (e.g., son, daughter, husband, grandfather, grandmother, and the like). If the grandmother enters the premise 400, the security system 419 may determine to not trigger an alarm if facial recognition determines the face of the grandmother matches one of the faces from the pictures. The security system 419 may, in some variations, use different or additional biometric data as part of the determination of whether to trigger an alarm (e.g., fingerprint, voice data, or the like).

Once an alarm is triggered or raised (such as if communications to or from a device deviate from that device's communication profile), the security system 419 may perform various actions such as, for example, causing an audible alarm sound to be played, causing an alarm message to be presented on the alarm panel 408, causing lights in the premises 400 to be turned on/off, causing additional sensors to be activated (e.g., turning on video cameras), cause a message to be sent to a mobile device 420 or to a monitoring entity 417.

In some arrangements, security system 419 and/or alarm panel 408 may be implemented in a computing device, such as a device depicted in FIG. 2. The security system 419 and/or alarm panel 408 may be implemented as part of a gateway, such as a gateway depicted in FIG. 1. Thus, in one example, the gateway 411 may be communicatively coupled to one or more devices (e.g., the smart device 117, the security sensors 406 and 407 and the other security components depicted in FIG. 4), which may allow gateway 411 to arm, disarm, deactivate, activate and/or monitor the security sensors 406 and 407 and the various other security components depicted in FIG. 4.

The security sensors 406 and 407, cameras 410, light 411, alarm panel 408, and security system 419 may be communicatively coupled to a user interface device, such as any of the various devices depicted in FIGS. 1 and 4. Through interactions with the user interface device, an authorized user may configure any of the security components depicted in FIGS. 1, 2, and 4. The security components may also transmit data between each other and/or the user interface device. For example, data (e.g., pictures, video, audio, various types digital or analog signal, and the like) from one of the security components (e.g., camera 410 or security sensor 406) may be transmitted to the user interface device for display.

In some embodiments, the security system 419 may be configured to confirm the location and identity of a user or other individual in the premises 400. For example, the security system 419 may determine the location of a user based on GPS location of a cellular device (e.g., mobile device 420). The security system 419 may also verify the identity of each user in the security network within premises 400 using several known recognition techniques, including for example, known key code, voice recognition, facial recognition, pattern recognition, body-mass recognition, fingerprint recognition, retina scanner recognition, and the like. The various recognition processes may be based on data collected from various security components within premises 400 or from another device in which the user provides the data (e.g., via a microphone of mobile device 420). For example, the data may be collected, from a camera, microphone, infrared sensor, fingerprint scanner, biometric sensor, or other type of sensor. The collected data may also be used to verify that the user is not under duress if he or she clears the alarm. For example, the surrounding area may be scanned to determine if another person is near a user attempting to deactivate the alarm and/or a voice of a user attempting to deactivate the alarm notification may be analyzed to determine if the user is in distress.

FIG. 4 also shows that the security system 419 may communicate with other entities, such as the local office 103 and the monitoring entity 417. Thus, the security system 419 may transmit data to and/or receive data from the local office 103 or the monitoring entity 417. The data may include information related to the security of the premises 400 such as, for example, information for an event detected by the security system 419 (e.g., a notification indicating there was a knock on a door), information for an alarm triggered by the security system (e.g., a notification that an alarm was triggered at the premises 400). The data, however, may include any data that could be monitored and/or recorded by the security system 419 or the other security components. For example, the data may include information or instructions regarding monitored communications to and/or from one or more of the devices and/or components shown in FIGS. 1, 2, and 4.

In some instances, transmitting data to the local office 103 and/or the monitoring entity 417 may assist in countering "smash and grab" scenarios during which an intruder smashes devices of the security monitoring system (e.g., alarm panel 408, camera 410, security sensors 406 and 407, etc.) in hopes of disabling the security monitoring system or preventing recording of the alarm event. In a smash and grab scenario, the security system 419 may transfer information upstream to the local office 103 and/or monitoring entity 417 so that the authorities can be alerted and/or data regarding the alarm or other events can be captured before the security monitoring system is disabled.

Referring to FIG. 4, if an alarm is triggered, the local office 103 may record information relating to the alarm (e.g., store information identifying the sensor(s) that were tripped, the location of the sensor(s) in the premises 400, record video and/or audio that depicts events that occurred during a time period based on if the alarm was triggered, etc.). Based on the recorded information, the local office 103 may determine an appropriate reaction and may transmit a signal to an external network, such as the public switched telephone network PSTN 412 and/or a wide area network WAN 413 (or the various networks depicted in FIG. 1, such as the links 101 and the network 109). For example, data from the security system 419 may be transmitted to and/or from the local office 103 and a user's mobile device 420 (e.g., via the PSTN 412 and the cell tower 414). In this manner, the user may receive notifications related to the security of the premises 400 and/or be able to control the security system 419 (and/or one or more devices associated therewith) via a device, such as the mobile device 420 or other user device. The notifications may be received by the mobile device 420 in various forms including, for example, an email, text message, or phone call. The user may receive the notifications via a dedicated software application installed on the mobile device 420 or via another application (e.g., an e-mail client or a text message client). Also, through the PSTN 412, the local office 103 and/or the monitoring entity 417 may communicate with a public safety answering point (PSAP). Thus, the local office 103 and/or the monitoring entity 417 may alert authorities of the alarm, so that the authorities may be dispatched to the premises 400.

Additionally, or alternatively, the local office 103 and/or the security system 419 may transmit information related to the security of the premises 400 to a monitoring entity 417 via one or more networks such as the WAN 413 (e.g., the Internet). The monitoring entity 417 may be operated by the same entity that operates the local office 103 (e.g., the monitoring entity 417 and the local office 103 may be operated by the same service provider, which may also be the same service provider that operates the distribution network 100 of FIG. 1) or by a third party entity (e.g., the monitoring entity 417 may be a third-party home security provider). In some embodiments, the monitoring entity 417 may be responsible for monitoring the premises 400. This may include responding to information, received from the security system 419 or from the local office 103, that indicates an alarm was triggered for premises 400 or some other type of event occurred at the premises 400 (e.g., a deviation from or conformation with a device's communication profile). For example, the monitoring entity 417 may immediately contact a user or the appropriate authorities to dispatch them to the premises 400 upon receiving notification that an alarm was triggered for premises 400. As another example, a representative or automated system of the monitoring entity 417 may, in response to receiving notification that an alarm was triggered for premises 400, contact (e.g., via a phone call, e-mail, text, and/or other type of message that can be received by mobile device 420) a user to provide notification of the alarm for premises 400. The monitoring entity 417 may be able to interact with the user to determine whether to contact the authorities or to ignore the alarm.

Additionally, the local office 103 and/or the security system 419 may transmit information related to the security of the premises 400 via one or more networks such as the WAN 413 to a web portal server 418. The web portal server may be configured to manage a security monitoring account for the user and/or store information related to the security of the premises 400, such as a history of device classifications (e.g., malicious, non-malicious, etc.), a history of actions associated with monitored communications, a history of alarms, and other events that occurred at the premises 400. The web portal server 418 may be a computing device capable of providing a web portal through which users may view, on any connected display device, information regarding home security account and/or other information related to the security of the premises 400. The user may access the web portal using any device that can communicate with web portal server 418 via the WAN 413.

The user may be able to interact with the web portal in various ways. For example, a user may log onto the web portal (via an authentication process) and view information about a triggered alarm and other collected data related to the alarm, such as data indicating what device(s) and/or security sensor(s) caused the alarm to be triggered and a time the alarm was triggered. The user may, in some variations, be able to view video from the various cameras 410 located in the premises 400, and check and/or control the status of the security system 419 and the various security components of the premises 400 (e.g., to see if the security system 419 is armed and arm or disarm the system as desired).

The web portal may also allow a user to customize settings for the security system 419 and the various security components of premises 400. For example, a user may, via the web portal, customize a schedule to indicate if and how the security system 419 should operate (e.g., indicate certain times during which the security system 419 is to automatically arm/and or disarm itself). The user may provide access to his or her calendar (e.g., a calendar associated with the user's work e-mail account, a calendar associated with the user's private e-mail account) the arming and/or disarming of the security system 419 may be based on the entries of that calendar. Additionally, the security system 419 and/or web portal may use the information of the home security account (e.g., based on a calendar entry or information on the schedule) to, for example, determine that a user is outside of the premises, and if the security system 419 has not been armed, to notify the user that the security system 419 is disarmed.

In some embodiments, a user's home security account may be associated with multiple premises and the web portal may provide access to each of the premises associated with the user's home security account. Accordingly, via the web portal, the user view various information related to the security of each premise including one or more device communication profiles, monitoring status, device classification, device status, alarms, events, video, security settings, and the like. In some cases, the information for each premises may be organized on a single page or display (e.g., a history of alarms and events for all premises may be displayed via the web portal).

In some embodiments, the local office 103, the monitoring authority 417, and/or the security system 419 may communicate with multiple users of the security network. For example, the multiple users may include one or more primary users and one or more secondary users, such as family members or other individuals likely to be in the premises 400 on a regular basis. A primary user may designate what family members (or any other individual) to include as one of the multiple users, and the primary user may designate each family member as a primary user or a secondary user. Other individuals may, based on the desires of a particular user, include members of the primary users' social network, such as neighbors and friends, etc. The primary user and the secondary users, if given authorization, may communicate with the local office 103, the monitoring entity 417 and/or the security system 419, for example, via a software application installed on computing device (e.g., a mobile computing device) or via a web portal.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. An apparatus comprising:
one or more processors; and
memory storing computer executable instructions that, when executed by the one or more processors, cause the apparatus to:
   determine, based on monitored communication between a first device and a second device via a network, information associated with expected communication behavior for the first device;
   determine, based on the expected communication behavior and based on monitored subsequent communication associated with the first device, a degree of communication deviation;
   compare the degree of communication deviation with a first deviation range of a plurality of different deviation ranges, wherein each of the deviation ranges is associated with one or more corresponding communication parameters;
   cause, based on the comparing, application of one or more communication parameters to communication of the first device; and
   control, based on the application, network access associated with the first device.

2. The apparatus of claim 1, wherein the applied one or more communication parameters comprises one or more of:
   a restriction on a packet size transmitted from the first device;

a restriction on a communication time for the first device;
a restriction on a communication attempt from the first device to another device; or
a restriction on a communication attempt from another device to the first device.

3. The apparatus of claim 1, wherein the instructions, when executed by the one or more processors, cause the apparatus to compare the degree of communication deviation with the first deviation range by comparing the degree of communication deviation with a threshold.

4. The apparatus of claim 1, wherein the instructions, when executed by the one or more processors, cause the apparatus to compare the degree of communication deviation with the first deviation range by comparing an expected size of data packets communicated by the first device with a current size of data packets communicated by the first device.

5. The apparatus of claim 1, wherein the instructions, when executed by the one or more processors, cause the apparatus to compare the degree of communication deviation with the first deviation range by comparing an expected frequency of communications of the first device with a current frequency of communications of the first device.

6. The apparatus of claim 1, wherein the instructions, when executed by the one or more processors, cause the apparatus to compare the degree of communication deviation with the first deviation range by comparing an expected type of communication protocol used by the first device with a current type of communication protocol used by the first device.

7. An apparatus comprising:
one or more processors; and
memory storing computer executable instructions that, when executed by the one or more processors, cause the apparatus to:
generate, based on detected communication associated with a first device, a historical communication pattern for the first device, wherein the first device is associated with a first network;
determine, based on detected communication associated with the first device, a current communication pattern associated with the first device; and
cause, based on whether the current communication pattern differs from the historical communication pattern by a threshold level, application of one or more communication parameters to communication of the first device.

8. The apparatus of claim 7, wherein the instructions, when executed by the one or more processors, further cause the apparatus to:
determine, from a plurality of communication parameters and based on a degree of deviation between the current communication pattern and the historical communication pattern being within a first deviation range, a first communication parameter,
wherein the first communication parameter has fewer restrictions than a second communication parameter associated with a second deviation range.

9. The apparatus of claim 7, wherein the instructions, when executed by the one or more processors, further cause the apparatus to:
determine, from a plurality of communication parameters and based on a degree of deviation between the current communication pattern and the historical communication pattern being within a first deviation range, a first communication parameter having fewer restrictions than a second communication parameter associated with a second deviation range;
determine, based on another detected communication associated with the first device, a second degree of deviation between another current communication pattern and the historical communication pattern within the second deviation range; and
cause, based on the second degree of deviation, application of the second communication parameter to further communication of the first device.

10. The apparatus of claim 7, wherein the instructions, when executed by the one or more processors, further cause the apparatus to:
determine, from a plurality of parameters and based on a degree of deviation between the current communication pattern and the historical communication pattern being within a first deviation range, a first communication parameter having fewer restrictions than a second communication parameter associated with a second deviation range;
determine, based on a second degree of deviation between the historical communication pattern and another detected communication associated with the first device, a different security status of the first device; and
cause, based on the different security status, application of one or more different communication parameters to communication of the first device, blocking communication to or from the first device, or allowing communication to or from the first device.

11. The apparatus of claim 7, wherein the instructions, when executed by the one or more processors, further cause the apparatus to:
determine a communication attempt from a second device to the first device;
determine a security status associated with the second device; and
restrict, based on the security status and on the applied one or more communication parameters, communication associated with the communication attempt.

12. The apparatus of claim 7, wherein the instructions, when executed by the one or more processors, cause the apparatus to cause application of one or more communication parameters to communication of the first device by causing application of the one or more parameters based on whether:
a packet size associated with the current communication pattern differs from the historical communication pattern by a first threshold level; or
a frequency of communication associated with the current communication pattern differs from the historical communication pattern by a second threshold level.

13. The apparatus of claim 7, wherein the instructions, when executed by the one or more processors, cause the apparatus to determine a degree of communication deviation based on different weights for a plurality of communication deviation types associated with the first device.

14. The apparatus of claim 7, wherein the instructions, when executed by the one or more processors, further cause the apparatus to:
set, based on determining that a sensor type of a second device corresponds to a sensor type of the first device, a security status of the second device by using expected communication behavior for the first device.

15. The apparatus of claim 7, wherein the instructions, when executed by the one or more processors, further cause the apparatus to:

update, based on another detected communication associated with the first device, an expected communication behavior of the first device.

16. An apparatus comprising:
one or more processors; and
memory storing computer executable instructions that, when executed by the one or more processors, cause the apparatus to:
   determine, based on monitored communication of a first device and monitored communication of a second device, expected communication behavior of the first device and expected communication behavior of the second device;
   determine, based on the expected communication behavior of the first device and expected communication behavior of the second device, a first degree of communication deviation for the first device and a second degree of communication deviation for the second device;
   compare the first degree of communication deviation with a first deviation range of a plurality of different deviation ranges and compare the second degree of communication deviation with a second deviation range of the plurality of different deviation ranges, wherein each of the deviation ranges is associated with one or more corresponding communication parameters; and
   cause, based on the comparing, application of one or more communication parameters to communication of the first device and application of one or more communication parameters to communication of the second device.

17. The apparatus of claim 16, wherein a degree of communication deviation within the second deviation range is greater than a degree of communication deviation within the first deviation range.

18. The apparatus of claim 16, wherein the instructions, when executed by the one or more processors, further cause the apparatus to:
   determine, based on another monitored communication associated with the second device, a third degree of communication deviation within the first deviation range; and
   cause, based on the third degree of communication deviation within the first deviation range, application of one or more different communication parameters to communication between the first device and the second device.

19. The apparatus of claim 16, wherein the instructions, when executed by the one or more processors, further cause the apparatus to:
   determine a first communication attempt from the second device to the first device;
   block communication associated with the first communication attempt;
   determine, based on another monitored communication associated with the second device, a third degree of communication deviation within the first deviation range;
   determine a second communication attempt from the second device to the first device; and
   allow, based on a combination of the first degree of communication deviation and the third degree of communication deviation, communication associated with the second communication attempt.

20. The apparatus of claim 16, wherein the instructions, when executed by the one or more processors, further cause the apparatus to:
   determine the first degree of communication deviation by causing application of a first weight to a communication deviation type; and
   determine the second degree of communication deviation by causing application of a second weight, different from the first weight, to the communication deviation type, and wherein the communication deviation type comprises one or more of:
      a deviation of a communication packet size;
      a deviation of a communication time;
      a deviation of a communication frequency; and
      a deviation of a communication target device.

* * * * *

UNITED STATES PATENT AND TRADEMARK OFFICE
CERTIFICATE OF CORRECTION

| | |
|---|---|
| PATENT NO. | : 10,721,257 B2 |
| APPLICATION NO. | : 16/269233 |
| DATED | : July 21, 2020 |
| INVENTOR(S) | : Poder et al. |

It is certified that error appears in the above-identified patent and that said Letters Patent is hereby corrected as shown below:

In the Specification

Column 16, Detailed Description, Line 12:
After "180a." please delete "¶"

Signed and Sealed this
Twelfth Day of July, 2022

*Katherine Kelly Vidal*

Katherine Kelly Vidal
*Director of the United States Patent and Trademark Office*